United States Patent [19]

Peerlkamp

[11] Patent Number: 4,853,282

[45] Date of Patent: Aug. 1, 1989

[54] MULTI-LAYER POLYAMIDE MOULDED ARTICLE

[75] Inventor: Erik R. Peerlkamp, Born, Netherlands

[73] Assignee: Stamicarbon B.V., Geleen, Netherlands

[21] Appl. No.: 131,085

[22] Filed: Dec. 10, 1987

[30] Foreign Application Priority Data

Dec. 10, 1986 [NL] Netherlands .......................... 8603138

[51] Int. Cl.$^4$ ........................ B32B 5/16; B32B 27/08; B32B 27/34
[52] U.S. Cl. .................................... 428/323; 428/324; 428/474.9; 428/475.5
[58] Field of Search ............... 428/474.4, 474.7, 475.5, 428/474.9, 324, 323; 528/335, 336

[56] References Cited

U.S. PATENT DOCUMENTS

| | | | |
|---|---|---|---|
| 4,408,036 | 10/1983 | Gaymans et al. | 528/336 X |
| 4,460,762 | 7/1984 | Gaymans et al. | 528/335 |
| 4,668,542 | 5/1987 | LeCreff | 428/474.7 X |
| 4,705,719 | 11/1987 | Yamanaka et al. | 428/474.4 X |

OTHER PUBLICATIONS

Le Cleff, *Plastiques Modernes et Elastomers,* May 1986, pp. 44–47.

*Primary Examiner*—Thomas J. Herbert
*Attorney, Agent, or Firm*—Cushman, Darby & Cushman

[57] ABSTRACT

A multi-layer polyamide moulded articles having, inter alia, improving mechanical properties, one layer of which is reinforced with filler and covered at least on one side with a non-reinforced polyamide layer and of which the polyamide substantially consists of nylon 4,6 and the filler is non-fibrous.

14 Claims, No Drawings

MULTI-LAYER POLYAMIDE MOULDED ARTICLE

The invention relates to polyamide moulded articles consisting of a plurality of layers. Such moulded articles are known from JP-A No.56008239, which describes a production process in which a preform of a thermoplastic resin is introduced into a mould, which is subsequently after-filled with the resin. Either the preform or the after-filled resin contains fibrous reinforcement. The preferred thermoplastic resins mentioned are polyamides such as nylon 6, nylon 6,6, nylon 6,10, nylon 6,12, nylon 11 and nylon 12, polyesters, polyolefins and polystyrenes. Reinforcing fibrous materials are glass fibre, carbon fibre, asbestos fibre, metal fibre, aromatic polyamide fibre, etc. The products obtained have a good rigidity and a smooth surface.

Technological progress implies that users will make higher and higher, combined in many cases with more and more, demands on products they want to use.

Thus the use, for instance, in the automotive industry requires, in addition to rigidity and smooth surface, a high impact resistance, a continuously improved temperature resistance and in many cases a good paintability or metallizability. In electronics dimensional stability at fluctuating temperatures and a sometimes very good adhesion of metal layers plays a special part, in addition to rigidity and smooth surface, and in the lighting industry where, owing to miniaturization, smaller and smaller and increaingly complex forms of reflectors are required, which must consequently also have an improved temperature resistance and dimensional stability, the processability plays a major part, in addition to the metallizability of the surface.

The polyamide multi-layer moulded articles with fibrous reinforcement as described in JP-A No.56008239 cannot properly satisfy these increased and combined demands.

For that reason the object of the invention is to develop a multi-layer moulded article, which can be obtained in a simple conventional manner, which meets the requirements in respect of rigidity and smoothness of surface as known from the state of the art and which also has an improved dimensional stability while retaining impact resistance, a higher temperature resistance and an improved adhesion for metal layers or paints.

After intensive research it has now been found that by applying the polyamide nylon 4,6 as thermoplastic resin and a nonfibrous filler instead of fibrous reinforcing materials a multi-layer moulded article is obtained that complies with these increased and combined demands.

The multi-layer polyamide moulded article according to the invention comprises a filler-reinforced polyamide layer covered on at least one side with a non-reinforced polyamide layer, characterized in that
a. the polyamide is substantially composed of tetramethyleneadipamide units
b. the filler is predominantly non-fibrous.

The filler may in principle have all forms, such as the form of a powder, globules, non-rounded particles, small plates and even small bars, the length:width ratio being not higher than 10:1, preferably smaller than 3:1. Filler in the form of fibres must be avoided, because otherwise, owing to anisotropic effects, generally no homogeneous dimensional stability is obtained. A minor amount of fibrous material (i.e. less than 50% (wt) preferably less than 30 % (wt) of the total amount of fillers) is permissable indeed provided, owing to the presence of the other fillers, the anisotropic effect by the presence of the fibrous material in, for instance, the injection moulding of moulded parts is sufficiently disturbed due to the presence of preferably an excess of non-fibrous fillers. The filler preferably consists of powdery, plate-shaped or spherical material. Highly suitable fillers are talcum, mica and lime.

The concentration of the filler in the filler-containing layer may vary within very wide limits, for instance between 10 and 80% (wt) calculated on the total weight of the layer. The content is preferably between 25 and 60% (wt). Depending on the filler used, the best result is achieved with a content between 35 and 55% (wt).

The polyamide according to the invention may be a homopolyamide, a copolyamide or a polyamide mixture and is substantially composed of tetramethylene-adipamide units, for instance at least 75% of the number of units, preferably the number of tetramethyleneadipamide units amounts to more than 85%; even more advantageous is a content of at least 90% tetramethyleneadipamide units. The best results are achieved with homopolymer. There is generally no restriction as to the copolymerization component or to the blend component, and for instance all known amide-forming subtances can be used. Examples of copolymerization components are amino acids, lactams, diamines and dicarboxylic acids. Examples of blend components are the polyamides formed from the above-mentioned copolymerization components. However, other monomers, too, and polymers formed from these, for instance ester-forming monomers, respectively polyester can be applied.

The polyamide substantially composed of tetramethylenadipamide units can be obtained in various ways known per se. Preferred preparation processes are described in, inter alia, U.S. Pat. Nos. 4,408,036 and 4,460,762. The degree of polymerization of the polyamide is not limited and in the reinforced layer it is usually such that the relative viscosity measured on a solution of 1 gramme in 100 ml 96%-(wt) sulphuric acid is at least 2.0, preferably at least 2.5. The degree of polymerization of the polyamide in the non-filled layer may be lower, if so desired, for instance resulting in a relative viscosity of 1.5. The upper limit of the degree of polymerization is usually determined by the processability of the polyamide and generally corresponds with a relative viscosity of 6.0.

The polyamide for the reinforced and for the non-reinforced layer may contain different additivies, depending on its further requirements to be imposed by its application. Such additives may be lubricants, pigments, colourants, flame retardants, stabilizers, etc. It is advantageous to add additives like pigments, colourants and stabilizers to the non-reinforced polyamide layer only if it is exposed. It is particularly advantageous to incorporate, for instance, metallic additives that serve to provide protection against electromagnetic radiation into the non-reinforced layer only.

Especially for uses for which a high notched impact resistance is required the best results are achieved if an impact modifier is added to the non-reinforced exposed layer. Impact modifiers known for polyamide applications include carboxylated olefin (co)polymers.

The thickness and number of the various layers of the moulded article according to the invention is not limited. Generally the thickness of the non-filled layers will be lower than that of the filled ones.

The moulded articles according to the invention can be obtained with various processes known per se, such as injection moulding, moulding, rolling, etc.

The invention will now be further elucidated by means of the following examples without, however, being limited thereto. Polyamide 4,6, STANYL®, $\eta$rel=3.2 of DSM, the Netherlands, and Polyamide 6,6, $\eta$rel=2.9 of Teijin, Japan, are used in the examples.

EXAMPLE I

On test bars obtained by multi-layer injection moulding, with a total thickness of 3.2 mm, the 2.0-mm-thick layer of which contains reinforcing fillers and the outer layers are otherwise non-filled and 0.6 mm thick, the following characteristics were determined. Table 1 shows the outcome of these measurements.

The test bars showed a smooth surface.

COMPARATIVE EXAMPLE 1

Experiments 1 and 7 are repeated, but instead of polyamide 4,6 polyamide 6,6 is used (exp. 9 and 10).

It is clear that rigidity and impact resistance fall short of the experiments in which polyamide 4,6 was used.

EXAMPLE II AND COMPARATIVE EXAMPLE 2

A filled strip of polyamide obtained by extrusion having a thickness of 1.5 mm and a width of 6 cm is hot-pressed with an equally wide 0.5-mm-thick non-filled strip of the same polyamide in a flat shape to form plates of a thickness of about 2.0 mm and 6×6 cm. The plates have smooth surfaces.

Of these plates the coefficient of thermal expansion is compared in two directions.

| polyamide filled layer | 4,6 glass fibre 40% (wt) | 6,6 glass fibre 40% (wt) | 4,6 glass fibre/clay 20% (wt)/35% (wt) |
|---|---|---|---|
| coefficient of expansion [× 10⁻⁵/°K.] machine direction | 3 | 3 | 3 |
| perpendicular to machine direction | 6 | 7 | 3.5 |

This clearly showes the superior dimensional stability of the composition according to the invention.

I claim:

1. Multi-layer polyamide moulded article comprising a filler-reinforced polyamide layer covered on at least one side with a non-reinforced polyamide layer, wherein
   a. the polyamide is substantially consisting of tetramethyleneadipamide units, b. the filler is predominantly non-fibrous.
2. Multi-layer polyamide moulded article according to claim 1, wherein the filler is chosen from the group of powdery, spherical or plate-shaped particles.
3. Multi-layer polyamide moulded article according to claim 2, wherein the filler is talcum or mica.
4. Multi-layer polyamide moulded article according to claim 1, wherein the filler content of the filler-containing layer is between 10 and 80% of the total weight of the layer.
5. Multi-layer polyamide moulded article according to claim 4, wherein the filler content of the filler-containing layer is between 25 and 60% (wt).
6. Multi-layer polaymide moulded article according to claim 5, wherein the filler content of the filler containing layer is between 35 and 55% (wt).
7. Multi-layer polyamide moulded article according to claim 1, wherein the content of tetramethyleneadipamide units in the polyamide is at least 75%.
8. Multi-layer polyamide moulded article according to claim 7, wherein the content of tetramethyleneadiapamide units is at least 85%.
9. Multi-layer polyamide moulded article according to claim 8, wherein the content of tetramethylenadipamide units is at least 90%.
10. Multi-layer polyamide moulded article according to claim 9, wherein the polyamide consists of polytetramethyleneadipamide homopolymer.
11. Multi-layer polyamide moulded article according to claim 1, wherein the degree of polymerization of the polyamide in the filler-containing layer at least results in

TABLE 1

| experiment no. | 1 | 2 | 3 | 4 | 5 | 6 | 7 | 8 | 9 | 10 |
|---|---|---|---|---|---|---|---|---|---|---|
| non-filled layer | PA46 | PA46 | PA46 | PA46 | PA46 | PA46 | PA46 | PA46 | PA66 | PA66 |
| impact modifier** | | | | | 10% | 10% | 20% | 20% | | 20% |
| filled layer | 40% | 40% | 40% | 40% | 40% | 40% | 40% | 40% | 40% | 40% |
| filler | mica | clay | mixt. glass + clay* | talcum | mica | clay | mica | clay | mica | mica |
| Tensile modulus*** [MPa] | 8075 | 5000 | 5760 | 6060 | 7775 | 4700 | 7350 | 4470 | 8450 | 8030 |
| HDT 1.8 MPa**** [°C.] | 260 | 238 | 264 | 254 | 244 | 220 | 238 | 213 | 226 | 212 |
| Coeff. of exp. *10⁻⁵ [°K.⁻¹] | 3 | 5 | 3 | 4 | 3.5 | 4 | 4 | 4 | 4.5 | 5.5 |
| Izod notched***** [kJ/m²] impact resistance | 7.5 | 8 | 7.5 | 7 | 15 | 14 | 24 | 22 | 4.5 | 18 |

*glass fibre/clay weight ratio = 2:3.5
**Keltaflex K 35ᴿ a carboxylated EPDM product of DSM, The Netherlands
***ISO R 527
****ISO 75
*****ASTM D 256 a relative viscosity of 2.0 measured on a solution of 1 gramme in 100 ml 96%-(wt) sulphuric acid.

12. Multi-layer polyamide moulded article according to claim 11, wherein the relative viscosity is at least 2.5.

13. Multi-layer polyamide moulded article according to claim 1, characterized in that the degree of polymerization of the polyamide in the non-filled layer at least results in a relative viscosity of 1.5.

14. Multi-layer polyamide moulded article according to claim 1, wherein the non-reinfoced layer contains one or more substantces chosen from the group of colourants, pigments, stabilizers, impact modifiers or additives protecting against electro-magnetic radiation.

* * * * *